US010876656B2

(12) United States Patent
Nagai et al.

(10) Patent No.: US 10,876,656 B2
(45) Date of Patent: Dec. 29, 2020

(54) HOSE CLAMP

(71) Applicant: PIOLAX, INC., Yokohama (JP)

(72) Inventors: Takao Nagai, Yokohama (JP); Tomoyuki Matsumoto, Yokohama (JP)

(73) Assignee: PIOLAX, INC., Yokohama (JP)

( * ) Notice: Subject to any disclaimer, the term of this patent is extended or adjusted under 35 U.S.C. 154(b) by 0 days.

(21) Appl. No.: 16/178,659

(22) Filed: Nov. 2, 2018

(65) Prior Publication Data
US 2019/0137007 A1 May 9, 2019

(30) Foreign Application Priority Data

Nov. 7, 2017 (JP) .................................. 2017-214646

(51) Int. Cl.
| F16L 3/12 | (2006.01) |
| F16L 3/10 | (2006.01) |
| F16L 3/13 | (2006.01) |
| F16L 33/03 | (2006.01) |
| F16L 33/02 | (2006.01) |
| B25B 27/14 | (2006.01) |

(Continued)

(52) U.S. Cl.
CPC ........... *F16L 3/1222* (2013.01); *F16L 3/1025* (2013.01); *F16L 3/1041* (2013.01); *F16L 3/13* (2013.01); *F16L 33/02* (2013.01); *F16L 33/03* (2013.01); *B25B 25/005* (2013.01); *B25B 27/146* (2013.01); *F16B 2/245* (2013.01)

(58) Field of Classification Search
CPC ......... F16L 33/03; F16L 33/02; F16L 3/1025; F16L 3/1041; F16L 3/1222; F16L 3/13; F16B 2/245; B25B 25/005; B25B 27/146; Y10T 24/1482; Y10T 24/1457; Y10T 24/1469; Y10T 24/148

See application file for complete search history.

(56) References Cited

U.S. PATENT DOCUMENTS

| 4,858,279 A * | 8/1989 | Kato ....................... F16L 33/03 24/20 R |
| 4,882,814 A * | 11/1989 | Takahashi ............... F16L 33/03 24/20 R |

(Continued)

FOREIGN PATENT DOCUMENTS

| DE | 19641108 C1 * | 1/1998 |
| JP | H 05-10891 U | 2/1993 |

(Continued)

*Primary Examiner* — Eret C McNichols
(74) *Attorney, Agent, or Firm* — McGinn I.P. Law Group, PLLC.

(57) ABSTRACT

There is provided a hose clamp. A clamp has a clamp body. On one end portion of the clamp body, a slit is provided and a first grip piece is formed. On the other end portion of the clamp body, a second grip piece is formed. A holder is provided with a holding groove and a grip portion. The holding groove has an insertion opening opened in a direction intersecting with an axial direction of the clamp body, and a side opening opened on at least one end side in the axial direction of the clamp body. A protrusion is provided on at least one of opposing inner surfaces of the holding groove. When the pair of grip pieces are inserted in the holding groove, the protrusion can be arranged inside a part of the slit located in the first grip piece.

20 Claims, 12 Drawing Sheets

(51) Int. Cl.
*B25B 25/00* (2006.01)
*F16B 2/24* (2006.01)

(56) References Cited

U.S. PATENT DOCUMENTS

| | | | | |
|---|---|---|---|---|
| 4,951,363 | A * | 8/1990 | Takahashi | F16L 33/03 24/20 R |
| 5,620,209 | A * | 4/1997 | Sauer | F16L 33/03 285/23 |
| 5,664,295 | A * | 9/1997 | Kume | F16L 33/03 24/20 CW |
| 5,675,871 | A * | 10/1997 | Webb | F16L 33/03 24/20 R |
| 5,865,072 | A * | 2/1999 | Jerdee | B25B 7/02 81/424.5 |
| 5,996,186 | A * | 12/1999 | Yamada | F16L 33/03 24/20 EE |
| 6,038,744 | A * | 3/2000 | Zielinski | F16L 33/03 24/20 EE |
| 6,192,555 | B1 * | 2/2001 | Nakamura | F16L 33/03 24/20 CW |
| 6,343,407 | B1 * | 2/2002 | Muto | F16L 33/03 24/20 CW |
| 6,343,772 | B1 * | 2/2002 | Oi | F16L 33/03 248/65 |
| 6,701,581 | B2 * | 3/2004 | Senovich | F16L 33/03 24/20 R |
| 7,520,475 | B2 * | 4/2009 | Opperthauser | F16L 3/24 248/71 |
| 9,180,576 | B2 * | 11/2015 | Wu | B25B 7/123 |
| 9,517,805 | B2 * | 12/2016 | Perry | B62D 65/005 |
| 9,873,188 | B1 * | 1/2018 | Chen | B25B 25/005 |
| 2002/0170729 | A1 * | 11/2002 | Murakami | B60R 16/0215 174/386 |
| 2003/0154823 | A1 * | 8/2003 | Klann | B25B 25/005 81/9.3 |
| 2004/0111840 | A1 * | 6/2004 | Gyongyosi | B65D 67/02 24/20 R |
| 2004/0237263 | A1 * | 12/2004 | Pina | F16L 33/03 24/20 R |
| 2008/0007043 | A1 * | 1/2008 | Martus | F16L 33/03 285/23 |
| 2009/0049656 | A1 * | 2/2009 | Morita | F16L 33/03 24/20 R |
| 2010/0107823 | A1 * | 5/2010 | Wu | B25B 25/005 81/9.3 |
| 2014/0331458 | A1 * | 11/2014 | Ozawa | F16L 33/03 24/270 |
| 2018/0347736 | A1 * | 12/2018 | Garcia Lopez | F16B 2/245 |
| 2019/0360512 | A1 * | 11/2019 | De Campos | F16B 2/245 |

FOREIGN PATENT DOCUMENTS

| | | | |
|---|---|---|---|
| JP | H0587391 U | * | 11/1993 |
| JP | 08270855 A | * | 10/1996 |
| JP | 2018194084 A | * | 12/2018 |

* cited by examiner

HOSE CLAMP

CROSS-REFERENCE TO RELATED APPLICATIONS

The disclosure of Japanese Patent Application No. 2017-214646 filed on Nov. 7, 2017, including specification, drawings and claims is incorporated herein by reference in its entirety.

TECHNICAL FIELD

The present disclosure relates to a hose clamp used, for example, when connecting pipings of an automobile to each other using a hose.

BACKGROUND

Conventionally, when connecting pipings of an automobile to each other using a hose, a method of fixing a flexible hose to a pipe-shaped piping by putting the hose on an outer circumference of an end portion of the piping and then tightening an outer circumference of the hose by means of a hose clamp is widely used. Also, when the hose clamp is put on the outer circumference of the hose, the hose clamp needs to be increased in diameter. Therefore, a hose clamp, on which a holder for holding the hose clamp in a diameter-increased state is previously mounted, is used in some cases.

For example, in Patent Document 1 as described below, a hose clip is disclosed, which has a clip body having a clamp portion formed in an annular shape and grip pieces formed by bending at both end portions thereof, and a holder separate from the clip body. The holder is formed in the shape of a generally U-shaped frame opened on both sides and also on a lower side, and on opposing wall portions thereof, locking protrusions are respectively provided to protrude inward therefrom in a convex shape. Also, in a pair of grip pieces, locking recesses are respectively formed to have a concave shape recessed toward the inside thereof to be mated with the locking protrusions of the holder. Also, in a state where the pair of grip pieces are made to approach each other and thus the clamp portion is increased in diameter, the holder is put on an outer circumference of the grip pieces and thus the locking protrusions of the holder are locked in the locking recesses of the grip pieces, thereby holding the pair of grip pieces in the approached state and thus the clamp portion in a diameter-increased state. The clamp portion in this state is arranged on an outer circumference of a hose, and then the holder is detached from the pair of grip pieces so that the locking protrusions are unlocked from the locking recesses. Therefore, the clamp portion is elastically restored so that the hose is tightened and fixed.

Patent Document 1: Japanese Utility Model Application Publication No. H05-010891 U In the hose clip of Patent Document 1, when the holder is detached from the clip body, the locking protrusions of the holder can be removed out of the locking recesses of the grip pieces, for example, by rotating the holder relative to the clamp portion or the like. Accordingly, workability in detaching of the holder is relatively good. However, while the clip body with the holder attached thereon is transported or an operation is performed thereon, the grip pieces are prone to be laterally removed out of the holder if an unintended or unexpected external force acts thereon due to falling of the clip or an operator, in particular if an external force acts thereon in an axial direction of the clamp portion. As a result, the holder is likely to be separated from the grip pieces.

Further, according to the hose clip, the locking recesses have to be provided on the pair of grip pieces of the clamp portion to be mated with the locking protrusions of the holder, thereby complicating a manufacturing process of the clamp. In addition, machining for the concave shape has to be performed on the grip pieces. Therefore, strength of the grip pieces is likely to be reduced.

SUMMARY

It is at least one of objects of the present disclosure to provide a hose clamp, in which workability in detaching is maintained, a holder is hardly separated from a clamp even if an unexpected external force acts on the holder, the clamp can be easily manufactured and also strength of grip pieces is not reduced.

According to an aspect of the embodiments of the present disclosure, there is provided a hose clamp, comprising: a clamp having a clamp body formed to be curved in an annular shape and configured to be arranged on an outer circumference of a hose, wherein on one end portion of the clamp body, a slit is provided to extend along a circumferential direction thereof and a first grip piece is formed to be bent outward in a radial direction thereof, wherein on the other end portion of the clamp body, a second grip piece is formed to be bent outward in the radial direction, wherein the second grip piece is arranged to oppose the first grip piece and to be inserted in the slit, wherein when the pair of grip pieces are separated away from each other, the clamp body is decreased in diameter and thus becomes a free state, whereas when the pair of grip pieces are made to approach each other, the clamp body is increased in diameter against elasticity thereof; and a holder provided with a holding groove and a grip portion, wherein the holding groove is configured to allow the pair of grip pieces in the approached state to be inserted therein and thus to hold the clamp body in the diameter-increased state, wherein the holding groove has an insertion opening opened in a direction intersecting with an axial direction of the clamp body and configured to allow the pair of grip pieces to be inserted therethrough, and a side opening opened on at least one end side in the axial direction of the clamp body, wherein a protrusion is provided on at least one of opposing inner surfaces of the holding groove, wherein when the pair of grip pieces are inserted in the holding groove, the protrusion can be arranged inside a part of the slit located in the first grip piece.

According to the hose clamp, the protrusion is provided on at least one of the opposing inner surfaces of the holding groove provided on the holder, and also when the pair of grip pieces is inserted therein, the protrusion can be arranged inside the part of the slit located in the first grip piece. Therefore, even if an unexpected external force acts on the clamp or the holder in the axial direction of the clamp body or in a direction perpendicular to the axial direction while the pair of grip pieces of the clamp is inserted and held in the holding groove of the holder, the protrusion provided on the inner surface of the holding groove is engaged with the inner periphery of the part of the slit located in the first grip piece, thereby inhibiting the pair of grip pieces from being removed and separated from the holding groove of the holder. As a result, it is possible to make it difficult for the holder to be separated from the clamp. Further, a structure for retaining the clamp on the holder needs not to be separately provided on the clamp itself. Therefore, manufacturability of the clamp can be enhanced and also reduction in strength of the grip pieces can be prevented. In addition, by a relatively simple operation of simply pulling or twisting the holder relative to the clamp body, the protrusion can be removed out of the part of the slit located in the first grip piece so that the holder can be detached from the clamp. Accordingly, workability in detaching of the holder is also not lowered.

BRIEF DESCRIPTION OF THE DRAWINGS

In the accompanying drawings:

FIGS. 3A and 3B show the holder constituting the hose clamp, in which

FIGS. 10A and 10B show the holder constituting the hose clamp, in which

DETAILED DESCRIPTION OF THE EMBODIMENTS

Hereinafter, one embodiment of a hose clamp according to the present disclosure will be described with reference to the accompanying drawings.

Figure 7:
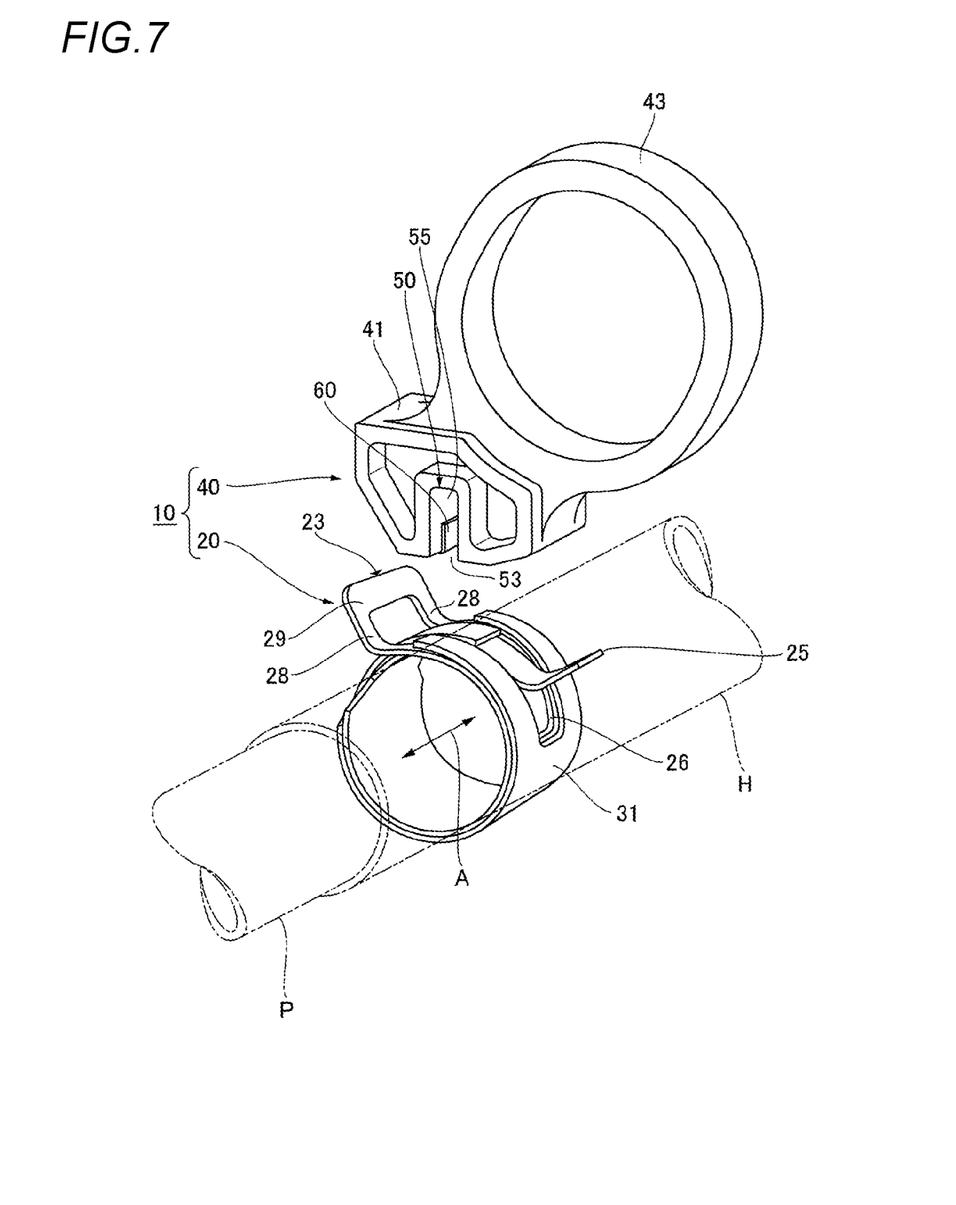
FIG. 7 is a perspective view of the hose clamp in a state where the holder is detached from the clamp and thus a clamp body thereof is increased in diameter.

As shown in FIG. 7, the hose clamp 10 according to the present disclosure is used to fix a hose H to a pipe-shaped piping P by tightening an outer circumference of the hose H put on an one end portion of the piping P. Also, as shown in FIG. 1, the hose clamp 10 includes a metallic clamp 20 and a holder 40 configured to be attached on the clamp 20.

Figure 1:
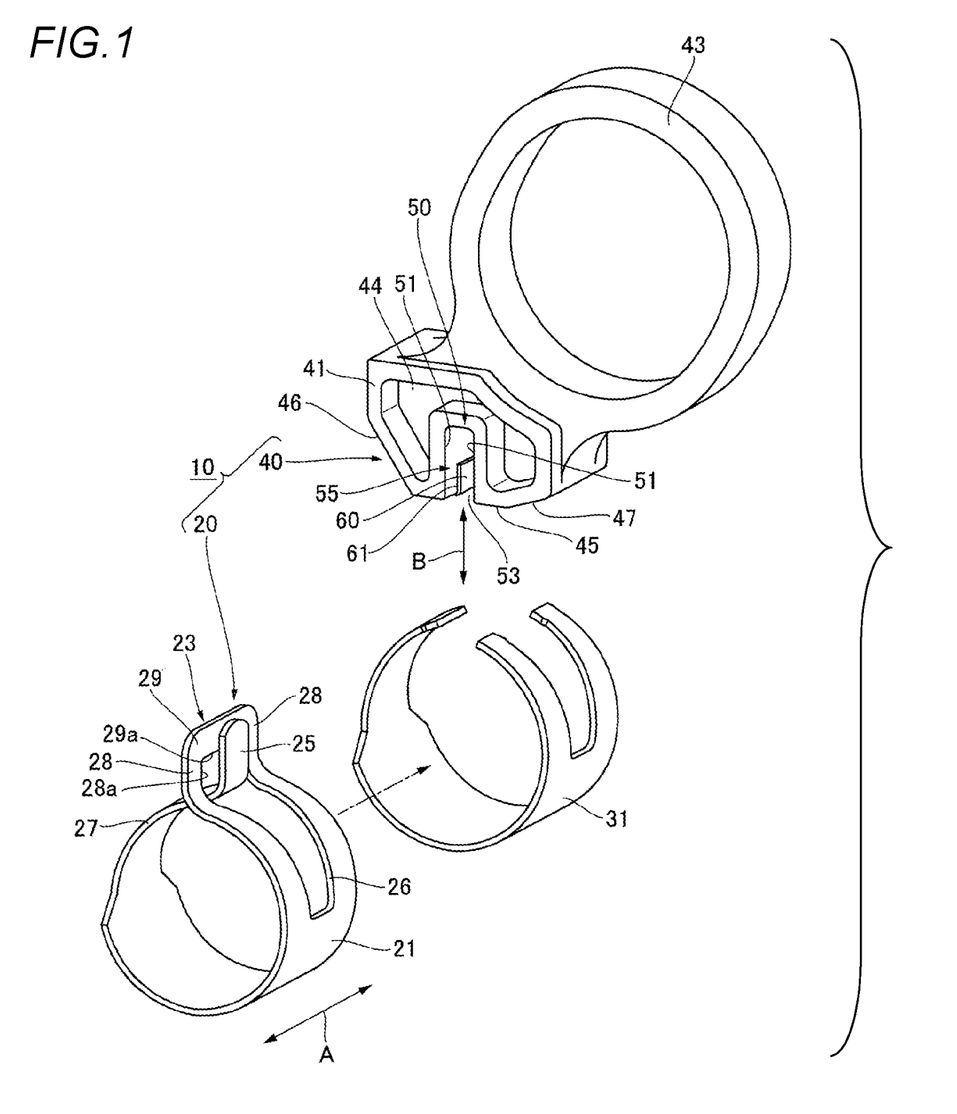
FIG. 1 is an exploded perspective view showing one embodiment of a hose clamp according to the present disclosure.

As shown in FIGS. 1 and 7, the clamp 20 is formed by annularly curving a metal material, such as stainless steel or spring steel, and has a clamp body 21 configured to be arranged on the outer circumference of the hose H while surrounding the outer circumference of the hose H, and a pair of grip pieces 23, 25 provided on both circumferential end portions thereof. Also, although the clamp body 21 is arranged on the outer circumference of the hose H (see FIG. 7), a direction along an axial direction of the hose H is referred to as an axial direction A of the clamp body 21.

More specifically, as shown in FIG. 1, the clamp 20 has a slit 26 formed on one circumferential end portion of the clamp body 21 to extend along the circumferential direction thereof by a predetermined length. Also, by bending a circumferential distal end side of a part of the clamp body 21, in which the slit 26 is formed, outward in a radial direction of the clamp body 21, the first grip piece 23 is provided to protrude outward in the radial direction of the clamp body 21 and also to have an arch shape (door shape). That is, as shown in FIG. 1, the first grip piece 23 has the shape of an arch defined by a pair of side walls 28, 28, which are erected from both sides, in the axial direction A, of the clamp body 21 at the circumferential distal end side of the slit 26 to be parallel to each other, and a connection wall 29 connecting distal ends of the pair of side walls 28, 28 with each other. In this way, the first grip piece 23 is configured such that a protrusion 60 of the holder 40 (see FIG. 1), as described below, is arranged inside a part of the slit 26, which is located in the first grip piece 23.

In addition, on the other circumferential end portion of the clamp body 21, an insertion piece 27 is formed to be inserted into the slit 26 and also to slide inside the slit 26 in the circumferential direction when a diameter of the clamp body 21 is increased or decreased. By bending a distal end side of the insertion piece 27 outward in the radial direction of the clamp body 21, the second grip piece 25 is provided to protrude outward in the radial direction of the clamp body 21 and also to be arranged to oppose the first grip piece 23.

Further, when the pair of grip pieces 23, 25 are separated away from each other, the clamp body 21 is decreased in diameter and thus becomes a free state (see FIG. 7). On the other hand, when the pair of grip pieces 23, 25 are made to approach each other, the clamp body 21 is increased in diameter against elasticity thereof (see FIGS. 1 and 4).

Figure 4:
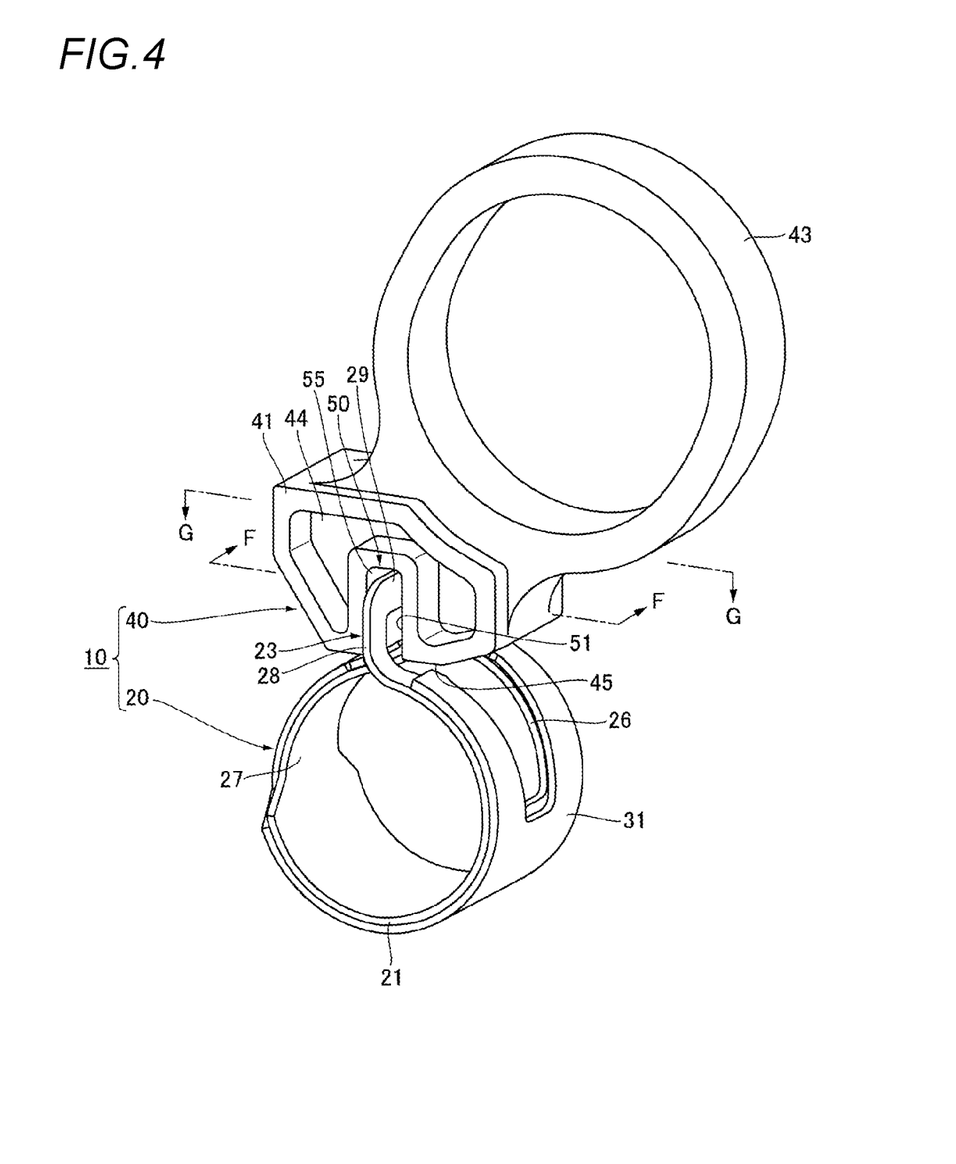
FIG. 4 is a perspective view of the hose clamp in a state where the holder is attached on a clamp.

Also, according to the present embodiment, as shown in FIGS. 1 and 4, a reinforcing clamp 31 is mounted on the outer circumference of the clamp body 21, thereby increasing the elasticity of the clamp body 21. Alternatively, the reinforcing clamp 31 may not be mounted.

As shown in FIG. 1, the holder 40 has a holding portion 41 for holding the pair of grip pieces 23, 25 in the approached state, and an annular grip portion 43 provided to be contiguous to the holding portion 41 and configured to allow a finger to be hooked therein when the holder 40 is detached from the clamp 20.

Figure 2:
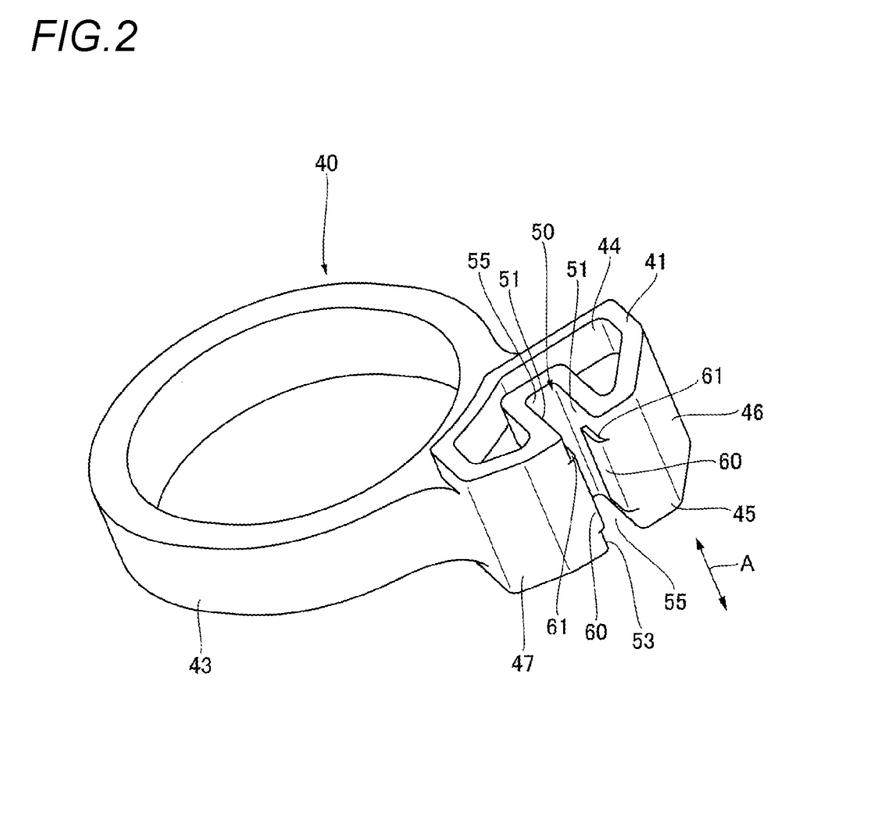
FIG. 2 is a perspective view of a holder constituting the hose clamp as viewed in a direction different from FIG. 1.

The holding portion 41 is formed to have a predetermined thickness along the axial direction A of the clamp body 21, and recess portions 44 having a predetermined depth are respectively formed in both end surfaces in an axial direction (thickness direction) thereof (see FIGS. 1 and 2). Meanwhile, the axial direction of the holding portion 41 is the same as the axial direction A of the clamp body 21 (hereinafter, the axial direction of the holding portion 41 is also designated by the reference numeral "A").

Also, tapered surfaces 46, 47 are respectively formed on both sides, in a width direction (a direction perpendicular to the axial direction A of the holding portion 41), of a side surface 45 of the holding portion 41, which faces the clamp 20 (hereinafter, referred as to "clamp-facing surface 45"). Further, the annular grip portion 43 extends obliquely outward from a side surface of the holding portion 41 opposite to the clamp-facing surface 45.

In addition, the holding portion 41 has a holding groove 50, which is configured to allow the pair of grip pieces 23, 25 in the approached state to be inserted therein and thus to hold the clamp body 21 in the diameter-increased state. As shown in FIGS. 1 to 3B, the holding groove 50 of the present embodiment has a pair of inner surfaces 51, 51 at a substantially middle position on the holding portion 41 in the width direction thereof. The pair of inner surfaces 51, 51 is configured to oppose each other with a predetermined distance therebetween and also to extend parallel to each other along the axial direction A of the holding portion 41. The opposing inner surfaces 51, 51 are formed to have a length extending to the clamp-facing surface 45. Thus, the holding groove 50 is formed in the shape of a recessed groove opened on both end sides, in the axial direction A, of the holding portion 41 and also at the clamp-facing surface 45 side thereof.

Therefore, the holding groove 50 has an insertion opening 53 opened in a direction B intersecting with the axial direction A of the clamp body 21 and configured to allow the pair of grip pieces 23, 25 to be inserted therethrough, and side openings 55, 55 opened on the both sides, in the axial direction A, of the clamp body 21. Alternatively, the side opening of the holding groove may be opened on at least one end side of the clamp body in a direction along the axial direction A.

Figure 5:
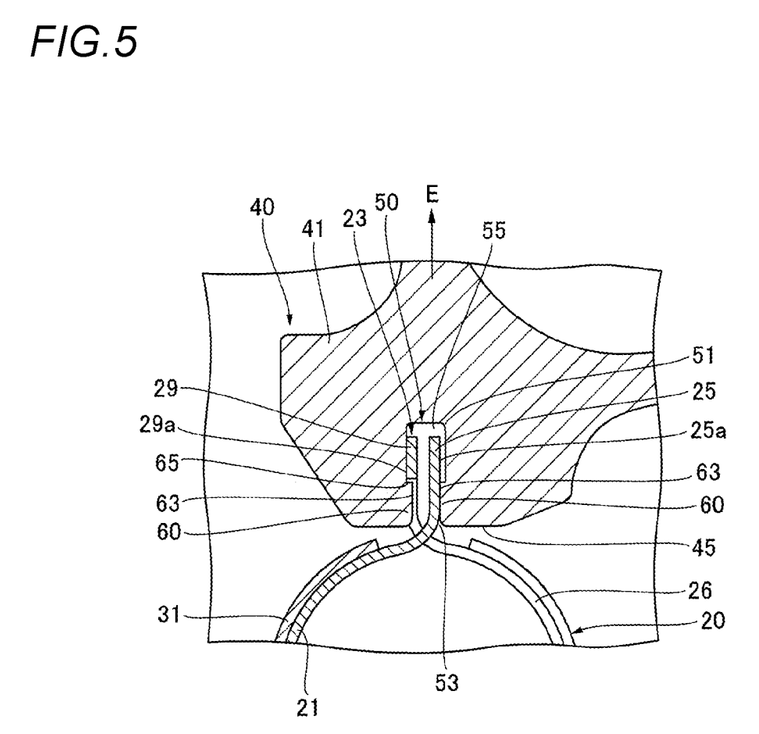
FIG. 5 is a sectional view taken along an arrow line F-F in FIG. 4.
Figure 6:
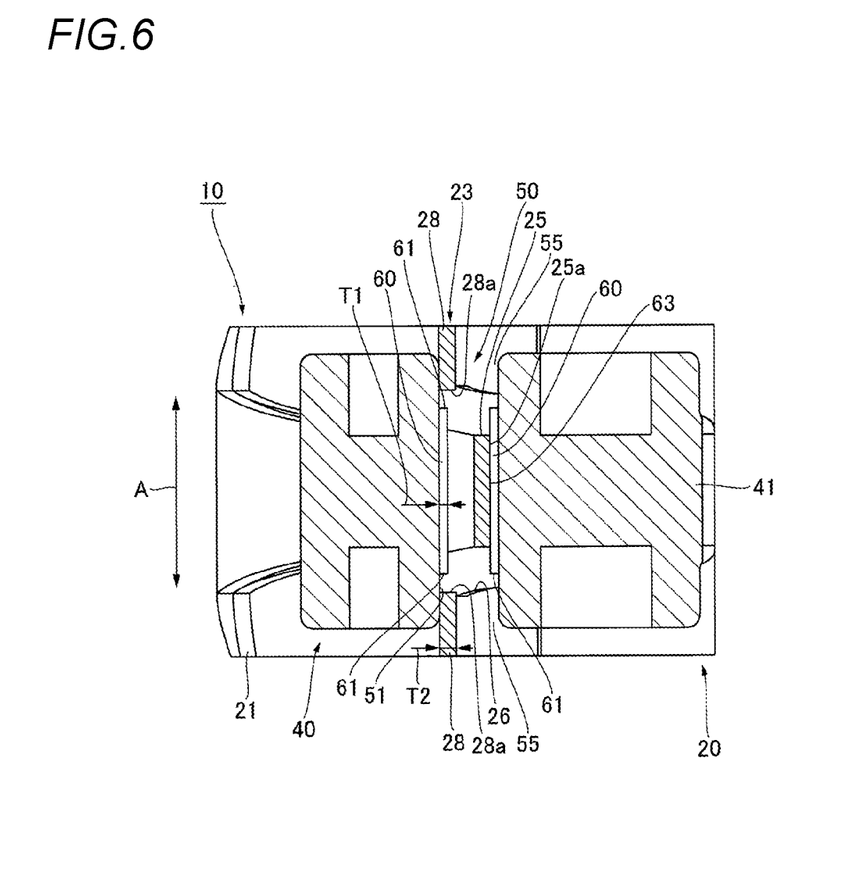
FIG. 6 is a sectional view taken along an arrow line G-G in FIG. 4.

Also, as shown in FIGS. 2, 3A, 3B, and 6, protrusions 60 having a predetermined height are respectively formed to protrude from a substantially middle position, in the axial direction A of the holding portion 41, on the opposing inner surfaces 51, 51 of the holding groove 50. The protrusions 60 have a generally rectangular shape extending long along the axial direction A of the holding portion 41. As shown in FIG. 6, side surfaces 61 of each of the protrusions 60 facing the side openings 55 of the holding groove 50, i.e., both side surfaces 61, 61 of each of the protrusions 60 intersecting with the axial direction A of the clamp body 21 in the present embodiment is formed in the shape of a flat surface to be parallel to each other. Further, as shown in FIG. 5, a protruding surface 63 of each of the protrusions 60 facing the inside of the holding groove 50 is also formed in the shape of a flat surface to be parallel to the inner surfaces 51 of the holding groove 50.

Alternatively, the protrusions 60 may be formed, for example, in a square shape or the like, and accordingly, the shape thereof is not particularly limited. But, it is preferable that the side surfaces of the protrusions facing the side openings of the holding groove are a flat surface.

Figure 3A:
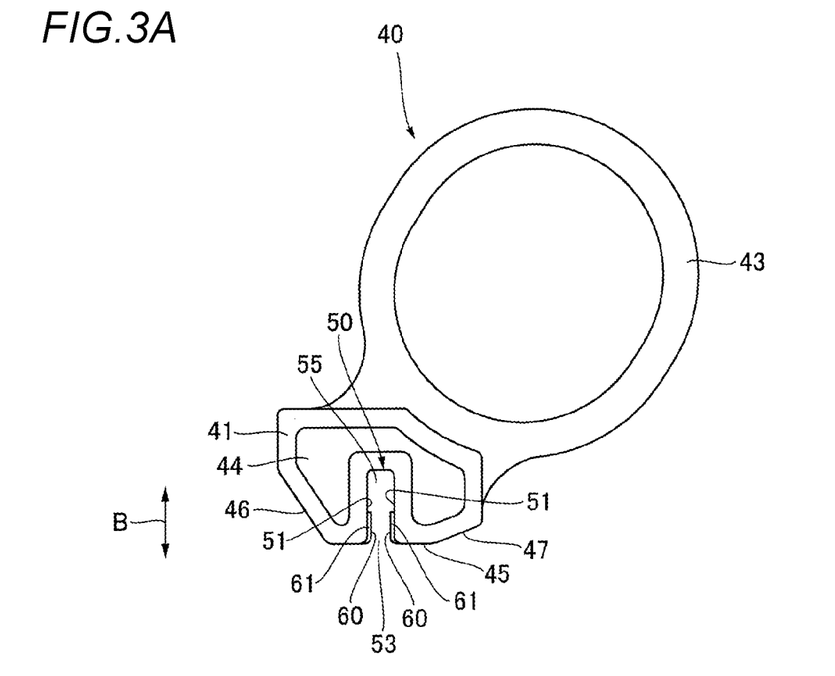
FIG. 3A is a front view and FIG. 3B is a bottom view.
Figure 3B:
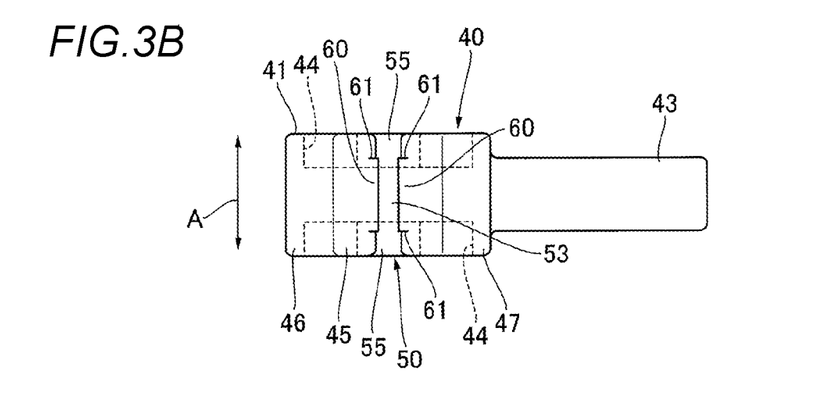

Further, the protrusions 60 of the present embodiment are provided in a pair to be axial-symmetrically arranged on the opposing inner surfaces 51, 51 of the holding groove 50 when viewing the holder 40 from the side of the insertion opening 53 of the holding groove 50 as shown in FIG. 3A and also when viewing the holder 40 from the side of the side openings 55 of the holding groove 50 as shown in FIG. 3B. Alternatively, the protrusions 60 may be provided on only one of the inner surfaces 51, and also a plurality of protrusions 60 may be provided on one or both of the inner surfaces 51. In addition, in the case where the protrusions 60 are provided on both inner surfaces 51, 51, the protrusions 60 may be offset from each other in a direction along the axial direction A of the clamp body 21, or in a direction, along which the grip pieces are inserted into the holding groove 50, and accordingly, arrangement thereof is not particularly limited.

Also, as shown in FIGS. 3A and 5, each of the protrusions 60 has a length extending to the insertion opening 53 of the holding groove 50. Alternatively, the protrusions 60 may have a length shorter than the length extending to the insertion opening 53 of the holding groove 50.

Further, when the pair of grip pieces 23, 25 is inserted in the holding groove 50 of the holding portion 41 as shown in FIG. 4, one of both protrusions 60, as shown in FIGS. 5 and 6, is configured to be arranged inside a part of the slit 26, which is located in the first arch-shaped grip piece 23 (here, inside a space defined by the pair of side walls 28, 28 and the connection wall 29). In addition, the other protrusion 60, which is not arranged inside the part of the slit 26 located in the first grip piece 23, is configured such that the protruding surface 63 thereof abuts against an outer surface 25a of the second grip piece 25 (see FIGS. 5 and 6).

Meanwhile, as shown in FIG. 6, a length of the protrusions 60 along the axial direction A of the clamp body 21 (a distance between both side surfaces 61, 61) is formed to be shorter than a distance between inner surfaces 28a, 28a of the side walls 28, 28 of the first grip piece 23. Therefore, when the one protrusion 60 is arranged inside the part of the slit 26 located in the first grip piece 23, gaps are respectively created between the side surfaces 61 of the protrusion 60 and the inner surfaces 28a of the side walls 28 of the first grip piece 23, so that the protrusion 60 is movable in the axial direction A of the holding portion 41 within the part of the slit 26 located in the first grip piece 23 (see FIG. 6).

Further, according to the present embodiment, as shown in FIG. 6, when the holder 40 has been moved along the axial direction A of the clamp body 20 relative to the clamp 20, the side surfaces 61 of the protrusion 60 facing the side openings 55 of the holding groove 50 can abut against an inner periphery of the part of the slit 26 located in the first grip piece 23 (herein, the inner surfaces 28a of the side walls 28). Accordingly, the pair of grip pieces 23, 25 is prevented from being removed and separated from the holding groove 50 of the holding portion 41 through the side openings 55 thereof.

Further, as shown in FIG. 5, when the protrusion 60 is arranged inside the part of the slit 26 located in the first grip piece 23, an inner surface 29a of the connection wall 29 of the first grip piece 23 is configured to be positioned on a more inward side of the holding groove 50 (more inward in the inserting direction of the pair of grip pieces 23, 25) than an engaging surface 65 of the protrusion 60 (end surface of the protrusion 60 opposite to the insertion opening 53 of the holding groove 50). Therefore, in the case where the holder 40 is pulled in a direction separating the clamp 20 and the holder 40 from each other as shown by an arrow E in FIG. 5, i.e., outward in the radial direction of the clamp body 21, the engaging surface 65 of the protrusion 60 is engaged with the inner surface 29a of the connection wall 29 of the first grip piece 23. As a result, unless a predetermined pulling force or greater acts on the holder 40, the holder 40 is prevented from being separated from the clamp 120.

Further, as shown in FIG. 6, a protruding amount T1 of the protrusions 60 from the inner surfaces 51 of the holding groove 50 in the present embodiment is set to about half a thickness T2 of the first grip piece 23.

The holder 40 is integrally formed by a synthetic resin material. For example, the synthetic resin material may include synthetic resins, such as polyacetal (POM), polyamide (PA), fluoride resin, polybutylene terephthalate (PBT), polyphenylene sulfide (PPS) and polypropylene (PP), or reinforced synthetic resins obtained by incorporating glass fiber, carbon fiber, metal fiber or the like into theses synthetic resins.

Next, a procedure for tightening and fixing a flexible hose H, which is made of a material, such as rubber, to the piping P, such as a pipe, using the hose clamp 10 having the above configuration will be described.

That is, in a state where the pair of grip pieces 23, 25 are separated away from each other and thus the clamp body 21 of the clamp 20 is decreased in diameter (see FIG. 7), the pair of grip pieces 23, 25 is pinched by a tool, such as pliers or pincers, so that the pair of grip pieces 23, 25 approach each other against elasticity of the clamp body 21. Then, the insertion opening 53 of the holing groove 50 of the holder 41 is aligned with the pair of grip pieces 23, 25 approached each other. In this state, the holder 40 is pushed relative to the clamp 20. Then, both grip pieces 23, 25, which are inserted through the insertion opening 53 of the holding groove 50, are pushed therein while being in sliding contact with the protruding surfaces 63 of the protrusions 60. Thus, as shown in FIGS. 5 and 6, one of the protrusions 60 enters the part of the slit 26 located in the first arch-shaped grip piece 23, and also the protruding surface 63 of the other protrusion 60 abuts against with the outer surface 25a of the second grip piece 25. As a result, the pair of grip pieces 23, 25 in the approached state is inserted in the holding groove 50, so that the clamp body 21 is held in a diameter-increased state. In this way, as shown in FIG. 4, the holder 40 can be attached on the clamp 20.

Thereafter, the clamp body 21 in the diameter-increased state is arranged on an outer circumference of the hose H mounted on an outer circumference of one end portion of the piping P. Meanwhile, the clamp 20 is generally positioned and fixed on the outer circumference of the hose H by means of adhesive or the like. In this state, a finger is hooked into the annular grip portion 43 of the holder 40, and then the holder 40 is pulled or twisted relative to the clamp 20 using the finger, so that the one protrusion 60 is removed out of the inner periphery of the part of the slit 26 located in the first grip piece 23. In this way, the pair of grip pieces 23, 25 is separated from the holding groove 50. Then, as shown in FIG. 7, the pair of grip pieces 23, 25 are separated away from each other due to the elasticity of the clamp body 21, and thus the insertion piece 27 slides inside the slit 26, thereby decreasing the diameter of the clamp body 21. Therefore, the hose H can be tightened and fixed to the piping P via the hose clamp 10.

In addition, according to the hose clamp 10, when the pair of grip pieces 23, 25 is inserted between the opposing inner surfaces 51 of the holding groove 50 of the holder 40, one of the protrusions 60 is arranged inside the part of slit 26 located in the first arch-shaped grip piece 23. Therefore, even if an unexpected external force acts on the clamp 20 or the holder 40 in the axial direction A of the clamp body 21 or in a direction perpendicular to the axial direction A while the pair of grip pieces 23, 25 is inserted and held in the holding groove 50, the one protrusion 60 is engaged with the inner periphery of the part of the slit 26 located in the first grip piece 23 (here, the inner surfaces 28a of the side walls 28 or the inner surface 29a of the connection wall 29), thereby inhibiting the pair of grip pieces 23, 25 from being removed and separated from the holding groove 50 of the holder 40. As a result, it is possible to make it difficult for the holder 40 to be separated from the clamp 20.

Further, a structure for retaining the clamp 20 on the holder 40 needs not to be separately provided on the clamp 20 itself. Therefore, manufacturability of the clamp 20 can be enhanced and also reduction in strength of the grip pieces 23, 25 can be prevented. Also, as described above, by a relatively simple operation of simply pulling or twisting the holder 40 relative to the clamp 20, the protrusion 60 can be removed out of the part of the slit 26 located in the first grip piece 23 so that the holder 40 can be detached from the clamp 20. Accordingly, workability in detaching of the holder 40 is also not lowered.

Further, according to the present embodiment, as shown in FIG. 6, when the holder 40 has been moved along the axial direction A of the clamp body 20 relative to the clamp 20, the side surfaces 61 of the protrusion 60 facing the side openings 55 of the holding groove 50 (here, the side surfaces 61 intersecting with the axial direction A of the clamp body 21) can abut against the inner periphery of the part of the slit 26 located in the first grip piece 23 (here, the inner surfaces 28a of the side walls 28). Accordingly, the pair of grip pieces 23, 25 is prevented from being removed and separated from the holding groove 50 of the holding portion 41 through the side openings 55 thereof. Therefore, as shown in FIG. 6, even if the holder 40 attempts to move relative to the clamp 20 in a direction along the axial direction A of the clamp body 21, the side surfaces 61 of the protrusion 60 abut against the inner surfaces 28a of the side walls 28, which are the inner periphery of the part of the slit 26 located in the first grip piece 23, thereby more reliably inhibiting the pair of grip pieces 23, 25 from being removed and separated from the holding groove 50.

Also, according to the present embodiment, as shown in FIGS. 3A and 5, each of the protrusions 60 has a length extending to the insertion opening 53 of the holding groove 50. Therefore, when the pair of grip pieces 23, 25 in the approached state is inserted into and held in the insertion opening 53 of the holding groove 50 of the holder 40 in order to attach the holder 40 onto the clamp 20 as described above, each of the grip pieces 23, 25 is hardly caught on the respective protrusions 60, thereby making it easy to insert the pair of grip pieces 23, 25 into the holding groove 50 and thus to attach the holder 40 onto the clamp 20. Also, since the protrusions 60 can be formed to be long in length, large parts of the side surfaces 61 of the protrusions 60 can be secured to be capable of abutting against the inner periphery of the part of the slit 26 located in the first grip piece 23. Thus, it is possible to inhibit the first grip piece 23 from being inclined or falling down relative to the protrusions 60, thereby holding the pair of grip pieces 23, 25 in a stable posture within the holding groove 50.

Further, according to the present embodiment, the protrusions 60 are provided in a pair to be axial-symmetrically arranged on the opposing inner surfaces 51, 51 of the holding groove 50 when viewing the holder 40 from the side of the insertion opening 53 of the holding groove 50 as shown in FIG. 3A and also when viewing the holder 40 from the side of the side opening 55 of the holding groove 50 as shown in FIG. 3B. Therefore, when the pair of grip pieces 23, 25 in the approached state is inserted into and held in the insertion opening 53 of the holding groove 50 of the holder 40, one of the protrusions 60 can enter the part of the slit 26 located in the first grip piece 23, even if the first grip piece 23 and the second grip piece 25 are inserted while being arranged to face either of the opposing inner surfaces 51, 51 of the holding groove 50. There is no directivity upon attaching of the holder, thereby more enhancing workability in attaching of the holder 40.

FIGS. 8 to 12 show another embodiment of a hose clamp according to the present disclosure. Meanwhile, components, which are substantially the same as those of the foregoing embodiment, are designated by the same reference numerals, and accordingly, the descriptions thereof will be omitted.

A hose clamp 10A of the present embodiment is different in shape of a clamp 20A and a holder 40A from that of the foregoing embodiment.

Figure 8:
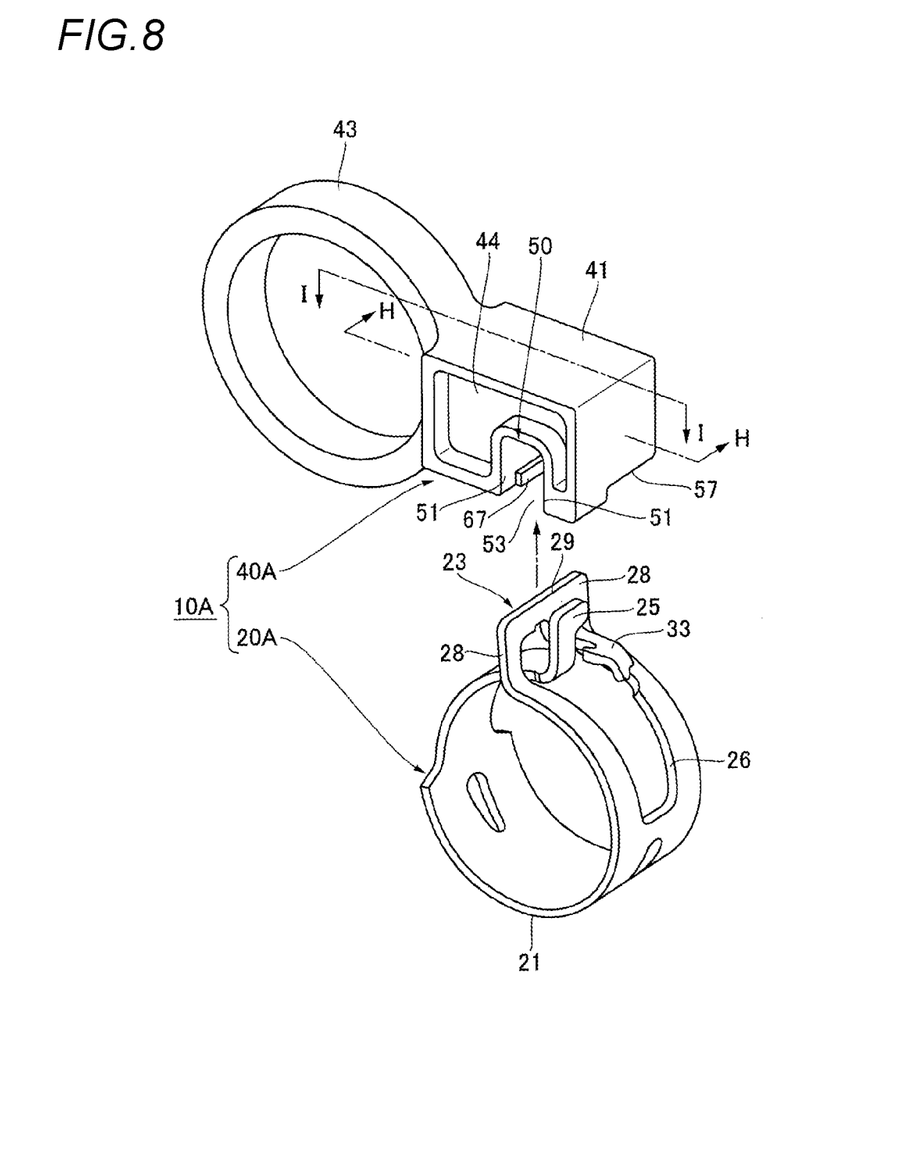
FIG. 8 is an exploded perspective view showing another embodiment of a hose clamp according to the present disclosure.

As shown in FIG. 8, the claim 20A has a hook-shaped locking piece 33 formed to protrude from one side, in a width direction, of a connection wall 29 of a first arch-shaped grip piece 23 toward the opposing second grip piece 25. In addition, the second grip piece 25 provided on the other circumferential end portion of the clamp 20A is arranged to oppose the first grip piece 23 while being arranged on a side of the locking piece 33. Although not shown, a clamp body 21 is held in a diameter-increased state by inserting a pair of grip pieces 23, 25, which have approached each other, into a holding groove 50 of the holder 40A.

Figure 9:
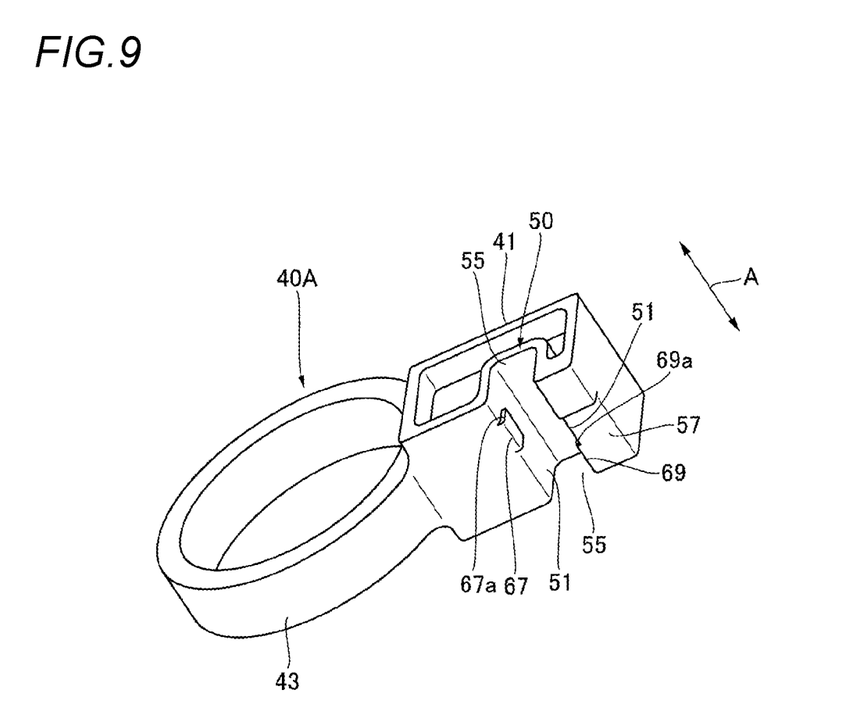
FIG. 9 is a perspective view of a holder constituting the hose clamp as viewed in a direction different from FIG. 8.
Figure 11:
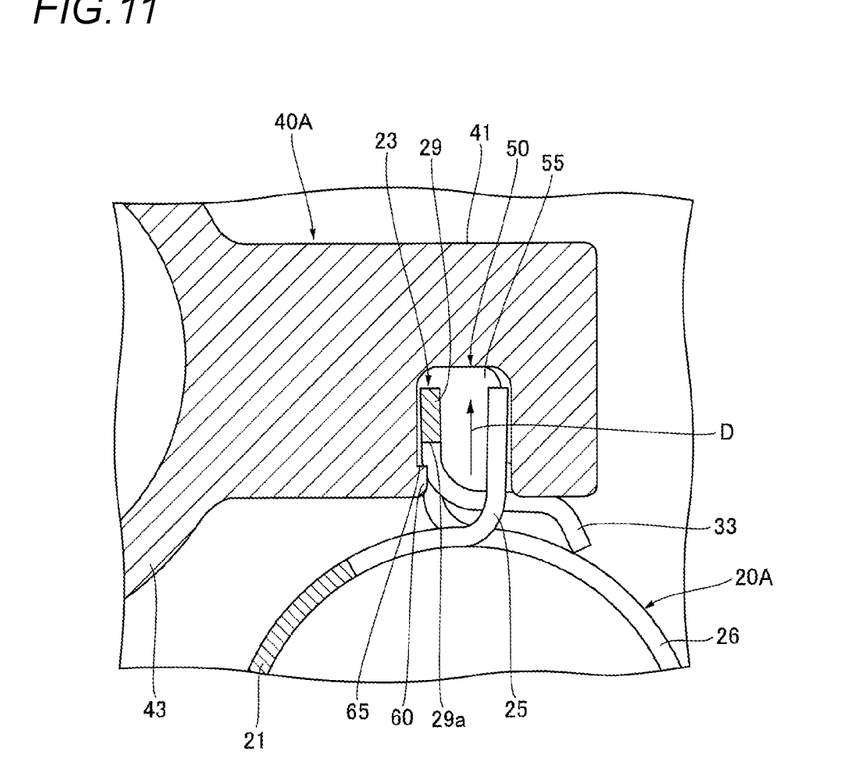
FIG. 11 is a sectional view taken along an arrow line H-H in FIG. 8 when assuming that the holder is attached on a clamp.

As shown in FIGS. 8 and 9, the holder 40A has a relief groove 57 formed on one side of a clamp-facing surface 45 of a holding portion 41 thereof in axial direction A of the holding portion 41 and configured to allow the locking piece 33 of the clamp 20A to be received therein. Also, an annular grip portion 43 extends from one side surface of the holding portion 41, which is perpendicular to the clamp-facing surface 45. As shown in FIG. 11, the grip portion 43 is configured to extend in a direction intersecting with a bending direction D of the pair of grip pieces 23, 25 relative to the clamp body 21 (here, a direction perpendicular to the bending direction D).

Figure 10A:
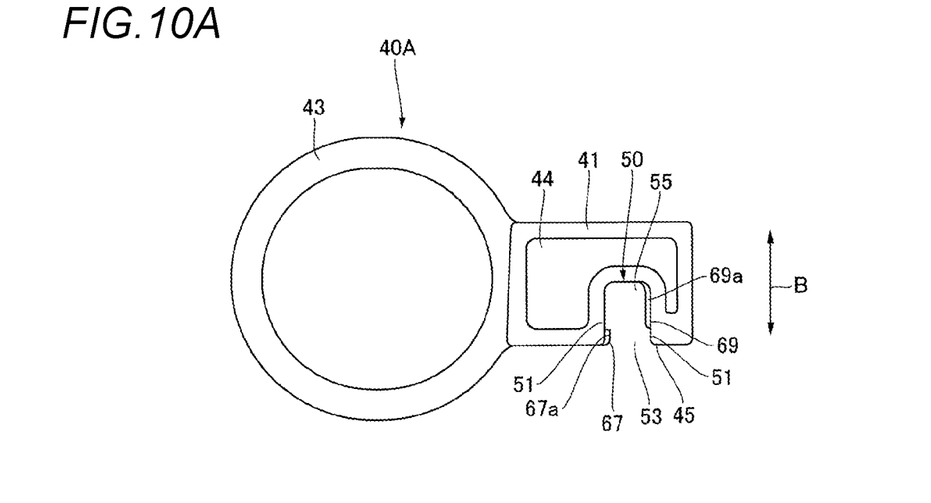
FIG. 10A is a front view and FIG. 10B is a bottom view.
Figure 10B:
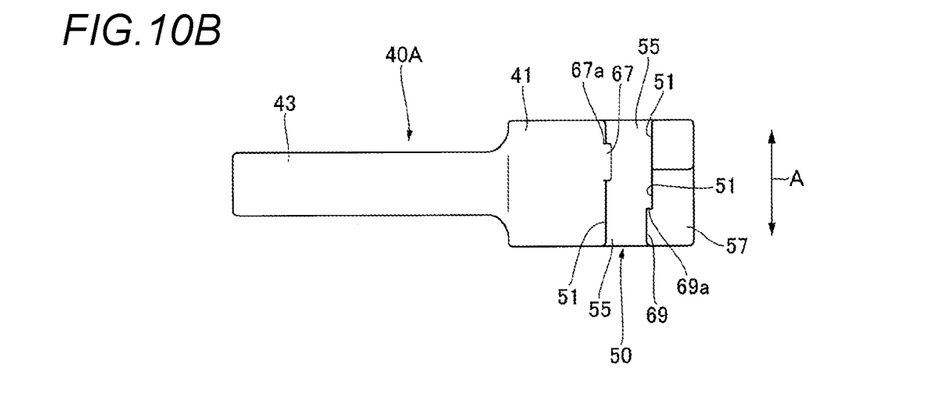
Figure 12:
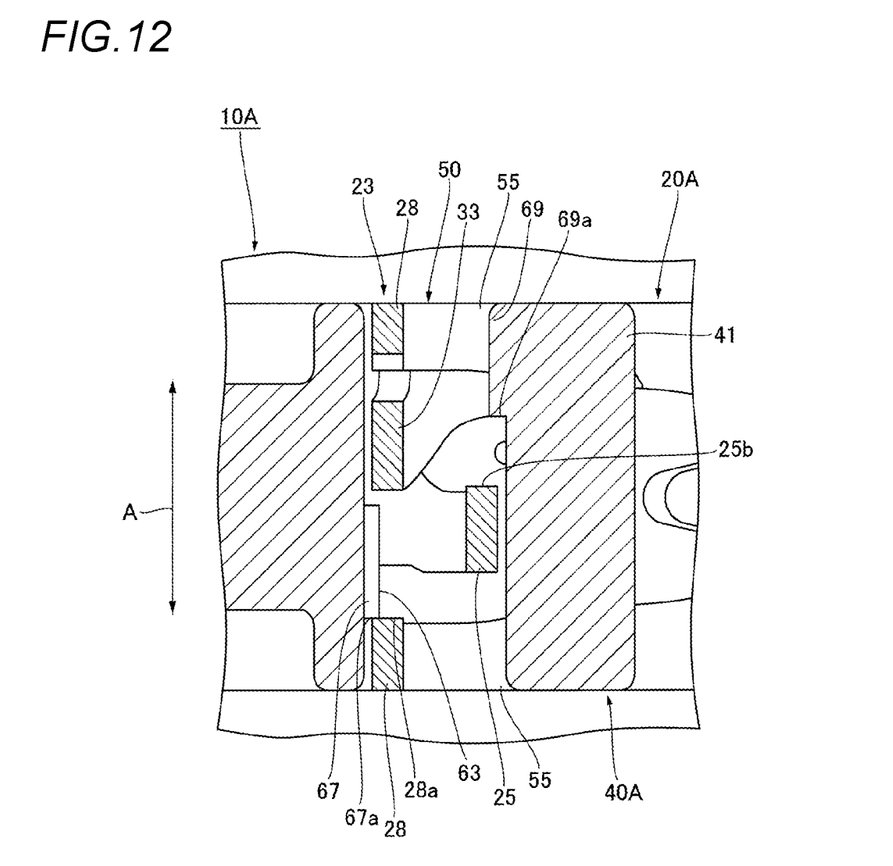
FIG. 12 is a sectional view taken along an arrow line I-I in FIG. 8 when assuming that the holder is attached on a clamp.

Further, as shown in FIGS. 9, 10A and 10B, a protrusion 67, which can be arranged inside a part of a slit 26 located in the first grip piece 23, is formed to protrude from a position on one of inner surfaces 51 of the holding groove 50 of the holding portion 41, which is located near to one end portion of the holding portion 41 in the axial direction A. As shown in FIG. 12, the protrusion 67 is configured such that a side surface 67a thereof facing a side opening 55 of the holding groove 50 can abut against an inner periphery of the part of the slit 26 located in the first grip piece 23 (here, an inner surface 28a of a side wall 28). In addition, the protrusion 67 has a length extending to an insertion opening 53 of the holding groove 50 (see FIGS. 10A and 11).

In addition, as shown in FIGS. 9, 10B and 12, an abutting protrusion 69 is formed to protrude from a position on the other inner surface 51 of the holding groove 50 of the holding portion 41, which is located on an end portion thereof opposite to the protrusion 67 in the axial direction A of the holding portion 41. As shown in FIG. 12, when the pair of grip pieces 23, 25 are inserted and held in the holding groove 50, the abutting protrusion 69 is arranged to be close to one side surface 25b of the second grip piece 25. Also, when the holder 40A has been moved along the axial direction A of the clamp body 21 of the clamp 20A, a side surface 69a of the abutting protrusion 69 can abut against the one side surface 25b of the second grip piece 25.

Further, as described above, according to the present embodiment, the protrusion 67, which can be arranged inside a part of a slit 26 located in the first grip piece 23, is provided on one of the opposing inner surfaces 51 of the holding groove 50. The side surface 67a of the protrusion 67 opposite to the side opening 55 of the holding groove 50 is configured to be capable of abutting against the inner periphery of the part of the slit 26 located in the first grip piece 23. Also, on the other inner surface 51 of the holding groove 50, the abutting protrusion 69 is provided to be capable of abutting against the one side surface 25b of the second grip piece 25. Accordingly, the protrusion 67 and the abutting protrusion 69 can respectively abut against the inner periphery of the part of the slit 26 located in the first grip piece 23 and the one side surface 25b of the second grip piece 25. Therefore, it is possible to hold the pair of grip pieces 23, 25 in a more stable posture within the holding groove 50 of the holder 40A.

In addition, according to the present embodiment, the annular grip portion 43 extend in a direction intersecting with the bending direction D of the pair of grip pieces 23, 25 relative to the clamp body 21. Accordingly, when the holder 40A is detached from the clamp 20A, it is easy to twist the holder 40A relative to the clamp body 21 while griping the grip portion 43, thereby more enhancing workability in detaching the holder 40A from the clamp 20A.

Meanwhile, the present invention is not limited to the foregoing embodiments, and accordingly various modified embodiments are possible within the spirit and scope of the present invention. Such embodiments are intended to be encompassed within the scope of the present invention.

What is claimed is:

1. A hose clamp, comprising:
a clamp including a clamp body formed to be curved in an annular shape and configured to be arranged on an outer circumference of a hose, wherein on one end portion of the clamp body, a slit is provided to extend along a circumferential direction thereof and a first grip piece is formed to be bent outward in a radial direction thereof, wherein on an other end portion of the clamp body, a second grip piece is formed to be bent outward in the radial direction, wherein the second grip piece is arranged to oppose the first grip piece and to be inserted in the slit, the first grip piece and the second grip piece forming a pair of grip pieces, wherein, when the pair of grip pieces are separated away from each other, the clamp body is decreased in a diameter to become a free state, and when the pair of grip pieces approach each other, the clamp body is increased in the diameter against elasticity thereof; and
a holder provided with a holding groove and a grip portion, wherein the holding groove is configured to allow the pair of grip pieces in an approached state to be inserted therein to hold the clamp body in a diameter-increased state,
wherein the holding groove includes an insertion opening opened in a direction intersecting with an axial direction of the clamp body and configured to allow the pair of grip pieces to be inserted therethrough, and a side opening opened on at least one end side in the axial direction of the clamp body,
wherein a protrusion is provided on at least one of opposing inner surfaces of the holding groove,
wherein, when the pair of grip pieces are inserted in the holding groove, the protrusion is configured to be arranged inside a part of the slit located in the first grip piece,
wherein a width of the protrusion in the axial direction of the clamp body is less than a width of the inner surfaces of the holding groove in the axial direction of the clamp body, and
wherein a distance between the opposing inner surfaces of the holding groove remains constant before and after the pair of grip pieces are inserted in the holding groove.

2. The hose clamp according to claim 1, wherein a side surface of the protrusion facing the side opening is configured to be capable of abutting against an inner periphery of the part of the slit located in the first grip piece, thereby preventing the pair of grip pieces from being removed and separated from the holding groove through the side opening.

3. The hose according to claim 1, wherein the protrusion has a length extending to the insertion opening of the holding groove.

4. The hose clamp according to claim 1, wherein the protrusion is provided in a pair to be axial-symmetrically arranged on the opposing inner surfaces of the holding groove when viewing the holder from a side of the insertion opening and from a side of the side opening.

5. The hose clamp according to claim 1, wherein the protrusion, which is configured to be arranged inside the part of the slit located in the first grip piece, is provided on one of the opposing inner surfaces of the holding groove,
wherein a side surface of the protrusion facing the side opening is configured to be capable of abutting against an inner periphery of the part of the slit located in the first grip piece, and
wherein on an other one of the opposing inner surfaces of the holding groove, an abutting protrusion is provided to be capable of abutting against one side surface of the second grip piece.

6. The hose clamp according to claim 1, wherein the grip portion is configured to extend in a direction intersecting with a bending direction of the pair of grip pieces relative to the clamp body.

7. The hose clamp according to claim 1, wherein a distal edge of the holding groove includes a distal edge of the insertion opening.

8. The hose clamp according to claim 1, wherein a distal edge of the holding groove includes a distal edge of the at least one of the opposing inner surfaces of the holding groove.

9. The hose clamp according to claim 1, wherein the protrusion is disposed on a distal edge of the holding groove.

10. The hose clamp according to claim 1, wherein the protrusion includes a flat surface that extends parallel to the inner surfaces of the holding groove.

11. The hose clamp according to claim 1, wherein, in the approached state, the protrusion abuts against an inner periphery of the part of the slit located in the first grip piece.

12. The hose clamp according to claim 11, further comprising another protrusion disposed on another one of the opposing inner surfaces of the holding groove, said another protrusion extending parallel to the protrusion.

13. The hose clamp according to claim 12, wherein, in the approached state, said another protrusion abuts against a side surface of the second grip piece.

14. A hose clamp, comprising:
a clamp including a clamp body curved in an annular shape, wherein on one end portion of the clamp body, a slit extends along a circumferential direction of the clamp body and a first grip piece bents outward in a radial direction of the clamp body, wherein on an other end portion of the clamp body, a second grip piece bents outward in the radial direction, wherein the second grip piece opposes the first grip piece and is inserted in the slit, the first grip piece and the second grip piece are separated away from each other in a free state of the clamp body and approach each other in an approached state of the clamp body; and
a holder including a holding groove and a grip portion, in the approached state of the clamp body, the first grip piece and the second grip piece being inserted into the holding groove to hold the clamp body,
wherein the holding groove includes an insertion opening for inserting the first grip piece and the second grip piece,
wherein a protrusion is provided on at least one of opposing inner surfaces of the holding groove,
wherein, in the approached state of the clamp body, the protrusion is arranged inside a part of the slit located in the first grip piece,
wherein a width of the protrusion in an axial direction of the clamp body is less than a width of the inner surfaces of the holding groove in the axial direction of the clamp body, and
wherein a distance between the opposing surfaces of the holding groove remains constant before and after the first grip piece and the second grip piece are inserted in the holding groove.

15. The hose clamp according to claim 14, wherein a distal edge of the holding groove includes a distal edge of the insertion opening.

16. The hose clamp according to claim 14, wherein a distal edge of the holding groove includes a distal edge of the at least one of the opposing inner surfaces of the holding groove.

17. The hose clamp according to claim 14, wherein the protrusion is disposed on a distal edge of the holding groove.

18. The hose clamp according to claim 14, wherein the protrusion includes a flat surface that extends parallel to the inner surfaces of the holding groove.

19. The hose clamp according to claim 14, wherein, in the approached state, the protrusion abuts against an inner periphery of the part of the slit located in the first grip piece.

20. The hose clamp according to claim 19, further comprising another protrusion disposed on another one of the opposing inner surfaces of the holding groove, said another protrusion extending parallel to the protrusion, and
wherein, in the approached state, said another protrusion abuts against a side surface of the second grip piece.

* * * * *